United States Patent
Petr et al.

(10) Patent No.: US 10,253,123 B2
(45) Date of Patent: Apr. 9, 2019

(54) IMPACT MODIFIER, A PROCESS TO PRODUCE THE SAME AND A POLYMER COMPOSITION COMPRISING THE SAME

(71) Applicant: Rohm and Haas Company, Philadelphia, PA (US)

(72) Inventors: Michael T. Petr, Collegeville, PA (US); Carlos A. Cruz, Collegeville, PA (US)

(73) Assignee: Rohm and Haas Company, Collegeville, PA (US)

( * ) Notice: Subject to any disclaimer, the term of this patent is extended or adjusted under 35 U.S.C. 154(b) by 10 days.

(21) Appl. No.: 15/535,055

(22) PCT Filed: Dec. 14, 2015

(86) PCT No.: PCT/US2015/065467
§ 371 (c)(1),
(2) Date: Jun. 11, 2017

(87) PCT Pub. No.: WO2016/100167
PCT Pub. Date: Jun. 23, 2016

(65) Prior Publication Data
US 2017/0362359 A1    Dec. 21, 2017

Related U.S. Application Data

(60) Provisional application No. 62/092,979, filed on Dec. 17, 2014.

(51) Int. Cl.
*C08F 2/22* (2006.01)
*C08F 220/12* (2006.01)
*C08F 285/00* (2006.01)
*C08L 27/06* (2006.01)
*C08F 265/06* (2006.01)

(52) U.S. Cl.
CPC ............ *C08F 220/12* (2013.01); *C08F 2/22* (2013.01); *C08F 265/06* (2013.01); *C08F 285/00* (2013.01); *C08L 27/06* (2013.01)

(58) Field of Classification Search
USPC ........................................... 525/85
See application file for complete search history.

(56) References Cited

U.S. PATENT DOCUMENTS

| | | | |
|---|---|---|---|
| 5,612,413 | A | 3/1997 | Rozkuszka et al. |
| 7,173,082 | B2 | 2/2007 | Ahn et al. |
| 2005/0119393 | A1 | 6/2005 | Ahn et al. |
| 2007/0060710 | A1 | 3/2007 | Jeong et al. |
| 2010/0028546 | A1 | 2/2010 | Roschmann et al. |

FOREIGN PATENT DOCUMENTS

| | | | | |
|---|---|---|---|---|
| EP | 0850740 | | 7/1998 | |
| EP | 1360214 A1 | * | 11/2003 | ............ C08F 265/06 |
| EP | 0927616 | | 10/2006 | |
| WO | WO 02/48223 | | 6/2002 | |
| WO | WO2005/023882 | | 3/2005 | |
| WO | WO2012/006297 | | 1/2012 | |
| WO | WO-2012006297 A1 | * | 1/2012 | ............ C08L 51/003 |

OTHER PUBLICATIONS

PCt Search Report dated Mar. 11, 2016; from counterpart PCT application PCT/US2015/065467.
PCT IPR Report dated Jun. 20, 2017; from counterpart PCT application PCT/US2015/065467.
Danni Wang et al; "Dispersion Polymerization of n-Butyl Acrylate," Journal of Applied Polymer Science, vol. 84, 2692-2709 (2002).
Danni Wang et al; "SeededDispersion Polymerization," Journal of Applied Polymer Science; vol. 84, 2710-2720 (2002).
J. Hasa et al.; "Stress-Strain Behavior in Extension of Elastomer Networks with Crosslinks of Different Lengths," Journal of Polymer Science: Polymer Physics Edition, vol. 11, 297-311 (1973).
Rodrigo Paris et al;, "Synthesis and characterization of functional gradient copolymers of allyl methacrylate and butyl acrylate," Journal of Polymer Science Part A-Polymer Chemistryl, (2006), 44(18) pp. 5304-5315.
EP Office Action dated Aug. 30, 2017; from counterpart EP Application No. 15828572,6.
EP Office Action dated Oct. 1, 2018; from counterpart EP Application No. 15828572.6.
Chinese Office Action dated Feb. 13, 2019; from counterpart Chinese Application No. 201580066248.0.

* cited by examiner

*Primary Examiner* — Terressa Boykin

(57) ABSTRACT

A process of emulsion polymerization comprising (a) adding a reactive mixture to a reaction vessel, said reactive mixture comprising water, one or more emulsifiers, one or more acrylate monomers, and a crosslinker having a free radical reactivity ratio of less than 1, (b) providing conditions in which said reactive mixture undergoes emulsion polymerization to form a crosslinked core having a glass transition temperature, Tg, of less than or equal to 10° C., or in the alternative, wherein the crosslinker is in an amount sufficient such that the crosslinked core has a swell ratio between 8 and 15 in THF and forming a polymer having an original ratio of units derived from the crosslinker to units derived from the acrylate monomer(s); and (c) feeding additional crosslinker during polymerization in an amount sufficient to maintain the original ratio of crosslinker to acrylate monomer(s) is provided. Further disclosed is an impact modifier composition and a polymer composition comprising an impact modifier.

5 Claims, No Drawings

IMPACT MODIFIER, A PROCESS TO PRODUCE THE SAME AND A POLYMER COMPOSITION COMPRISING THE SAME

FIELD OF INVENTION

The disclosure relates to an impact modifier, a process to produce an impact modifier and a polymer composition comprising the same.

BACKGROUND OF THE INVENTION

In an impact modifier, the impact resistance comes from the constituent crosslinked, low glass transition ($T_g$) rubber. The characteristics of this rubber directly affect the ability of the modifier to provide ductility in the host polymer during impact, and the most important of these characteristics is crosslink density, as measured by the swell ratio, because it controls the stiffness of the rubber and its ability to cavitate. Often, in an impact modifier, the crosslink density is controlled by the addition of a crosslinker into the low $T_g$ polymer. The distribution of the crosslink density and, thus, the swell ratio are directly proportional to the distribution of the crosslinker in the rubber. The rubber is also often made with a shot process, whereby all the monomer is charged to the reactor and then its polymerization is initiated, in order to keep the standing monomer concentration high and the branching in the rubber low; therefore, the crosslinker distribution and the resulting crosslink density distribution are entirely dependent on the reactivity ratios of the rubber monomer and crosslinker. There is a need, therefore, for an alternative to the shot emulsion polymerization process that will provide a more uniform crosslink density distribution.

SUMMARY OF THE INVENTION

In one embodiment, the disclosure provides a process of emulsion polymerization comprising (a) adding a reactive mixture to a reaction vessel, said reactive mixture comprising water, one or more emulsifiers, one or more acrylate monomers, and a crosslinker having a free radical reactivity ratio of less than 1, (b) providing conditions in which said reactive mixture undergoes emulsion polymerization to form a crosslinked core having a glass transition temperature, Tg, of less than or equal to 10° C. wherein the crosslinker is in an amount sufficient such that the crosslinked core has a swell ratio between 8 and 15 in THF and forming a polymer having an original ratio of units derived from the crosslinker to units derived from the acrylate monomer(s); and (c) feeding additional crosslinker during polymerization in an amount sufficient to maintain the original ratio of crosslinker to acrylate monomer(s).

In another embodiment, the disclosure provides an impact modifier comprising one or more core/shell polymers which comprise a crosslinked core having a glass transition temperature, Tg, of less than or equal to 10° C. produced according to the method of claim 1 and having from 98 to 99.9 wt % units derived from one or more acrylate monomers and from 0.1 to 2 wt % units derived from one or more crosslinkers, having a free radical reactivity ratio of less than 1, wherein the crosslinked core has a swell ratio in THF between 8 and 15; and a shell having from 20 to 100 wt % units derived from one or more (meth)acrylate monomers and having a Tg of equal to or greater than 20° C.; and wherein the swell ratio in THF of the crosslinked core is greater than the swell ratio of a crosslinked core having an identical composition but prepared according to a conventional single or multi-shot emulsion polymerization process.

In another embodiment, the disclosure provides a polymer composition comprising an impact modifier and a base polymer.

DETAILED DESCRIPTION OF THE INVENTION

The disclosure provides an impact modifier and a polymer composition comprising the impact modifier.

(Meth)acrylate means acrylate, methacrylate, or combinations of acrylate and methacrylate. For example, the term methyl (meth)acrylate may mean solely methyl methacrylate, solely methyl acrylate or a combination of methyl methacrylate and methyl acrylate.

Crosslinker free radical reactivity ratio, as used herein, means the free radical propagation rate constant from the acrylate monomer(s) to the acrylate monomer(s) relative to the free radical propagation rate constant from the acrylate monomer(s) to the vinylically unsaturated moiety in the crosslinker with the highest free radical reactivity ratio.

In a first embodiment, the disclosure provides a process of emulsion polymerization comprising (a) adding a reactive mixture to a reaction vessel, said reactive mixture comprising water, one or more emulsifiers, one or more acrylate monomers, and a crosslinker having a free radical reactivity ratio of less than 1, (b) providing conditions in which said reactive mixture undergoes emulsion polymerization to form a crosslinked core having a glass transition temperature, Tg, of less than or equal to 10° C. wherein the crosslinker is in an amount sufficient such that the crosslinked core has a swell ratio between 8 and 15 in THF and forming a polymer having an original ratio of units derived from the crosslinker to units derived from the acrylate monomer(s); and (c) feeding additional crosslinker during polymerization in an amount sufficient to maintain the original ratio of crosslinker to acrylate monomer(s).

Emulsion polymerization reaction vessels, or reactors, are well known and any such reactor may be used. Such reactors, include but are not limited to those discussed in, for example, D. C. Blackley, Emulsion Polymerization (Wiley, 1975).

Suitable emulsifiers include anionic surfactants, cationic surfactants, nonionic surfactants, zwitterionic surfactants, and mixtures thereof. In some embodiments, one or more anionic surfactant is used, optionally in a mixture with one or more nonionic surfactant. Some suitable anionic surfactants include, for example, alkyl sulfates, alkyl sulfonates, alkylaryl sulfates, alkylaryl sulfonates, and mixtures thereof. Some suitable nonionic surfactants include, for example, alkyl polyoxyalkylene nonionic surfactants, aryl polyoxyalkylene nonionic surfactants, polyoxyalkylene block copolymers, and mixtures thereof.

In the practice of the present invention, a reactive mixture is provided in a reaction vessel. The reactive mixture contains water, one or more emulsifier, one or more monomer, and one or more initiator. The ingredients of the reactive mixture may be brought together in any manner. For example, two or more of the ingredients of the reactive mixture, or portions thereof, may be mixed together before the mixture of those ingredients or portions thereof is placed into the reaction vessel. For example, any ingredients or portions thereof that are not mixed together outside of the reaction vessel may be added simultaneously or sequentially to the reaction vessel. Any combination of the above methods of providing the ingredients of the reactive mixture may be used.

After a reactive mixture is present in the reaction vessel, conditions are provided in which the reactive mixture undergoes emulsion polymerization. For example, conditions will be provided as needed for the initiator to form one or more free radical. That is, depending on the initiator used, for example, the reaction mixture may be heated, or a reductant may be added, or the reactive mixture may be exposed to radiation, or a combination thereof. Also, it is contemplated that other conditions that allow emulsion polymerization to succeed (such as, for example, emulsification of monomer, concentration of monomer, concentration of initiator, etc.) will also be provided.

In some embodiments, the conditions in which the reactive mixture undergoes emulsion polymerization will be established simultaneously with the introduction of the reactive mixture into the reaction vessel. For example, if the ingredients of the reactive mixture are not added simultaneously, in some embodiments the conditions in which the reactive mixture undergoes emulsion polymerization may be established simultaneously with the introduction of the final ingredient of the reactive mixture into the reaction vessel.

In some embodiments, the conditions in which the reactive mixture undergoes emulsion polymerization will be established after the introduction of the reactive mixture into the reaction vessel. For example, all of the ingredients of the reactive mixture may be provided in the reaction vessel, and then the contents of the reaction vessel may be heated to a temperature at which the initiator forms one or more free radical.

In conventional shot emulsion polymerization processes, the emulsion polymerization process includes at least one stage that includes at least one shot. In some shot embodiments, at least one shot introduces 10% or more of the total monomer of the entire emulsion polymerization process, by weight based on the weight of the total monomer for the entire emulsion polymerization process. In some shot embodiments, most (greater than 50%) or all of the monomer for the emulsion polymerization process is added to the reaction vessel as part of one or more shots, and each shot introduces 10% or more of the total monomer of the entire emulsion polymerization process, by weight based on the weight of the total monomer for the entire emulsion polymerization process.

In contrast to a conventional shot emulsion polymerization process, the method disclosed herein provides crosslinker to the polymerization process so as to provide a consistent level of crosslinker available for incorporation into the polymer, based upon the reactivity ratio of the crosslinker and the one or more acrylate monomers.

In a particular embodiment, the emulsion polymerization process further comprises monitoring the polymerization. Any suitable method for monitoring the progress of the polymerization may be used, including but not limited to monitoring the temperature and/or solids content and spectroscopic measurements of the contents, such as Raman spectroscopy.

In another embodiment, the disclosure provides an impact modifier composition comprising one or more core/shell polymers which comprise a crosslinked core having a glass transition temperature, Tg, of less than or equal to 10° C. produced according to the method of any embodiment disclosed herein and having from 98 to 99.9 wt % units derived from one or more acrylate monomers and from 0.1 to 2 wt % units derived from one or more crosslinkers, having a free radical reactivity ratio of less than 1, wherein the crosslinked core has a swell ratio in THF between 8 and 15; and a shell having from 20 to 100 wt % units derived from one or more (meth)acrylate monomers and having a Tg of equal to or greater than 20° C.; and wherein the swell ratio in THF of the crosslinked core is greater than the swell ratio of a crosslinked core having an identical composition but prepared according to a conventional single or multi-shot emulsion polymerization process.

In yet another embodiment, the disclosure provides a polymer composition comprising from greater than 0 to 50 wt % of one or more impact modifier compositions according to any embodiment disclosed herein; and from 50 to less than 100 wt % base polymers selected from the group consisting of polyesters, styrenic polymers, polymethacrylates, polyvinylchloride, polycarbonate, polyamides, copolymers and blends thereof and combinations thereof.

The disclosure further provides the emulsion polymerization process, impact modifier composition and polymer composition according to any embodiment disclosed herein, except that the crosslinked core of the core/shell polymer of the impact modifier comprises from 98 to 99.9 wt % units derived from one or more acrylate monomers. All individual values and subranges from 98 to 99.9 wt % are included and disclosed herein; for example, the amount of units derived from one or more acrylate monomers can range from a lower limit of 98, 98.3, 98.6, 98.9, 99.2, 99.5 or 99.8 wt % to an upper limit of 98.1, 98.4, 98.7, 99, 99.3, 99.6 or 99.9 wt %. For example, the amount of units derived from one or more acrylate monomer may be from 98 to 99.9 wt %, or in the alternative, from 98 to 99 wt %, or in the alternative, from 99 to 99.9 wt %, or in the alternative, from 98.5 to 99.5 wt %. The one or more acrylate monomer(s) which may be used in the crosslinked core include, but are not limited to $C_1$-$C_{20}$ alkyl acrylates, such as ethyl acrylate, butyl acrylate, and ethylhexyl acrylate.

The crosslinked core comprises from 0.1 to 2 wt % units derived from one or more crosslinkers having a free radical reactivity ratio less than 1. All individual values and subranges from 0.1 to 2 wt % are included and disclosed herein; for example, the amount of units derived from one or more crosslinkers can range from a lower limit of 0.1, 0.4, 0.7, 1, 1.3, 1.6 or 1.9 wt % to an upper limit of 0.2, 0.5, 0.8, 1.1, 1.4, 1.7 or 2 wt %. For example, the amount of units derived from one or more crosslinkers having a free radical reactivity ratio less than 1 can range from 0.1 to 2 wt %, or in the alternative, from 0.1 to 1.5 wt %, or in the alternative, from 1.5 to 2 wt %, or in the alternative, from 0.5 to 1.6 wt %.

The disclosure further provides the emulsion polymerization process, impact modifier composition and polymer composition according to any embodiment disclosed herein, except that the one or more acrylate monomers of the impact modifier crosslinked core is butyl acrylate, ethyl acrylate, ethylhexyl acrylate, or any combination thereof.

Any crosslinker having a free radical reactivity ratio of less than 1 may be used in embodiments of the invention herein. Examples of such crosslinkers include but are not limited to methacrylates, vinylaryls, divinylbenzene, oxazolines, acroleins, and methacrylamides.

The disclosure further provides the emulsion polymerization process, impact modifier composition and polymer composition according to any embodiment disclosed herein, except that the crosslinker of the impact modifier crosslinked core is allyl methacrylate.

The crosslinked core has a glass transition temperature, Tg, of less than or equal to 10° C. All individual values and subranges from less than or equal to 10° C. are included and disclosed herein. For example, the Tg of the crosslinked core may be less than or equal to 10° C., or in the alternative, be less than or equal to 0° C., or in the alternative, be less than or equal to −10° C., or in the alternative, be less than or equal to −20° C.

The disclosure further provides the emulsion polymerization process, impact modifier composition and polymer composition according to any embodiment disclosed herein, except that the crosslinked core comprises from 98 to 99.9 wt % units derived from butyl acrylate and from 0.1 to 2 wt % units derived from allyl methacrylate. All individual values and subranges from 98 to 99.9 wt % units derived from butyl acrylate are disclosed and included herein; for example, the amount of units derived from butyl acrylate can range from lower limit of 98, 98.4, 98.8, 99.2 or 99.6 wt % to an upper limit of 98.2, 98.6, 99, 99.4 or 99.9 wt %. For example, the mount of units derived from butyl acrylate may be from 98 to 99.9 wt %, or in the alternative, from 99.2 to 99.6 wt %, or in the alternative, from 98 to 99 wt %, or in the alternative, from 98.9 to 99.9 wt %. All individual values and subranges from 0.1 to 2 wt % units derived from allyl methacrylate are included and disclosed herein; for example, the amount of units derived from allyl methacrylate can range from a lower limit of 0.1, 0.5, 0.9, 1.3 or 1.7 wt % to an upper limit of 0.3, 0.7, 1.1, 1.5 or 2 wt %. For example, the amount of units derived from allyl methacrylate can be from 0.1 to 2 wt %, or in the alternative, from 0.4 to 0.8 wt %, or in the alternative, from 0.1 to 1 wt %, or in the alternative, from 1 to 2 wt %.

The crosslinked core of the core/shell polymer of the first impact modifier has a swell ratio in THF from 8 to 15. All individual values and subranges from 8 to 15 are included and disclosed herein; for example, the swell ratio can range from a lower limit of 8, 10, 13 or 14 to an upper limit of 9, 11, 13, or 15. For example, the swell ratio can range from 8 to 15, or in the alternative, from 8 to 12 or in the alternative, from 12 to 15, or in the alternative, from 10 to 13.

The crosslinked core of the core/shell polymer of the second impact modifier has a swell ratio in THF from 7 to 15. All individual values and subranges from 7 to 15 are included and disclosed herein; for example, the swell ratio can range from a lower limit of 7, 10, 13 or 14 to an upper limit of 8, 11, 13, or 15. For example, the swell ratio can range from 7 to 15, or in the alternative, from 7 to 12 or in the alternative, from 12 to 15, or in the alternative, from 10 to 13.

The shell of the core/shell polymer of the impact modifier has from 20 to 100 wt % units derived from one or more (meth)acrylate monomers. All individual values and subranges from 20 to 100 wt % are included and disclosed herein; for example, the units derived from one or more (meth)acrylate monomers can range from a lower limit of 20, 35, 50, 65, 80 or 95 wt % to an upper limit of 27, 42, 57, 72, 87 or 100 wt %. For example, the units derived from one or more (meth)acrylate monomers can be from 20 to 100 wt %, or in the alternative, from 20 to 50 wt %, or in the alternative, from 55 to 100 wt %. The one or more (meth) acrylate monomers which may be used in the shell include, but are not limited to $C_1$-$C_{20}$ alkyl (meth)acrylates, such as ethyl methacrylate, butyl methacrylate, ethylhexyl methacrylate, and ethyl acrylate. The shell may comprises from 0 to 80 wt % units derived from other monomers, such as but not limited to styrenic monomers, vinyl acetate, ethylene, propylene, acrolein, meth(acrylamide), vinyl chloride, or any other vinylically unsaturated monomers.

The shell of the core/shell polymer has a Tg of equal to or greater than 20° C. All individual values and subranges from equal to or greater than 20° C. are included and disclosed herein. For example, the Tg of the shell may be equal to or greater than 20° C., or in the alternative, equal to or greater than 30° C., or in the alternative, equal to or greater than 40° C., or in the alternative, equal to or greater than 60° C.

A skilled artisan would readily understand that the choice of materials used in the shell of the core/shell polymer of the impact modifier may be selected to maximize compatibility of the impact modifier with the base polymer in which it is to be used.

The disclosure further provides the emulsion polymerization process, impact modifier composition and polymer composition according to any embodiment disclosed herein, except that the impact modifier has a volume average particle size from 70 to 700 nm. All individual values and subranges from 70 to 700 nm are included and disclosed herein; for example, the volume average particle size of the impact modifier can range from a lower limit of 70, 200, 400, or 600 nm to an upper limit of 100, 300, 500, or 700 nm. For example, the particle size may be from 70 to 700 nm, or in the alternative, from 70 to 350 nm, or in the alternative, from 350 to 700 nm, or in the alternative, from 150 to 400 nm.

The polymer composition according to this disclosure polymer comprises from greater than 0 to 50 wt % of one or more impact modifier compositions according to any embodiment disclosed herein; and from 50 to less than 100 wt % base polymers selected from the group consisting of polyesters, styrenic polymers, polymethacrylates, polyvinylchloride, polycarbonate, polyamides, copolymers and blends thereof and combinations thereof. All individual values and subranges from greater than 0 to 50 wt % are included and disclosed herein; for example, the amount of impact modifier can range from a lower limit of 0.1, 10, 20, 30, or 40 wt % to an upper limit of 5, 15, 25, 35, 40, 45 or 50 wt %. For example, the amount of impact modifier can be from 0 to 50 wt %, or in the alternative, from greater than 0 to 25 wt %, or in the alternative, from 25 to 50 wt %, or in the alternative, from 10 to 30 wt %. All individual values and subranges from 50 to less than 100 wt % are included and disclosed herein; for example, the amount of base polymer in the polymer composition can range from a lower limit of 50, 60 70, 80, or 90 wt % to an upper limit of 55, 65, 75, 85, 95 or 99.9 wt %. For example, the amount of base polymer in the polymer composition can range from 50 to less than 100 wt %, or in the alternative, from 50 to 80 wt %, or in the alternative, from 80 to less than 99.9 wt %, or in the alternative, from 70 to 90 wt %.

The base polymer is selected from the group consisting of polyesters, styrenic polymers, polymethacrylates, polyvinylchloride, polycarbonate, polyamides, copolymers and blends thereof and combinations thereof.

In a particular embodiment, the structural base polymer is polyvinylchloride.

EXAMPLES

The following examples illustrate the present invention but are not intended to limit the scope of the invention.

Comparative Impact Modifier Examples 1 and 2 utilized a conventional triple shot process to make an impact modifier with a butyl acrylate (BA) core crosslinked with two different levels of allyl methacrylate. Two core-shell acrylic impact modifiers with a butyl acrylate (BA) core crosslinked with two different levels of allyl methacrylate (ALMA) were produced using the inventive process. Emulsions of water, sodium lauryl sulfate (SLS), BA and 22.5% of the ALMA and of water, SLS, and the remaining 77.5% of ALMA were mixed. 30% of the BA emulsion was added the reactor and its polymerization initiated, and, upon initiation, 30% of the ALMA emulsion was fed over 5 minutes. After the temperature peaked and reactor was cooled, the process was repeated with 40% and then the remaining 30% of the two emulsions. Then another emulsion of water, SLS, and MMA was mixed, added to the reactor, and polymerized.

TABLE 1

| wt % ALMA in Impact Modifier | Swell Ratio of Core of Impact Modifier | Process | % ductile breaks | |
|---|---|---|---|---|
| | | | 4 phr Impact Modifier in Base Polymer | 4.5 phr Impact Modifier in Base Polymer |
| 0.71 | 7.2 | Conventional 3 shot process Comp. Ex 1 | 0 | 70 |
| 0.45 | 10.1 | Conventional 3 shot process Comp. Ex 2 | 5 | 75 |
| 0.5 | 12.6 | Inv. Ex. 1 | 30 | 100 |
| 0.71 | 9.9 | Inv. Ex. 2 | 70 | 100 |

Test Methods

Test methods include the following:

Swell Ratio is measured by dissolving 5 wt % polymer in THF. The solution is then centrifuged to separate the insoluble portion. After that, the insoluble portion is weighed, dried, and then weighed again, and the swell ratio is defined as the ratio of the wet weight to the dry weight.

% ductile breaks is measured according to ASTM D-256, Notched Izod Impact Strength for Plastics.

Samples are prepared by first preparing a master batch of PVC. In this particular case, the following formulation was used:

| Component | Specifics | Parts per hundred (phr) of PVC |
|---|---|---|
| PVC | FORMOLON 622S | 100.00 |
| Heat Stabilizer | ADVASTAB TM-181FS | 1.2 |
| Lubrication package | ADVALUBE B-3314 | 2.7 |
| Lubricating process aid | PARALOID K-175 | 0.5 |
| Process Aid | PARALOID K-400 | 1.0 |
| Filler | TiO$_2$ (Titanium dioxide) | 9.0 |
| Filler | UFT (CaCO$_3$) Calcium Carbonate | 3.0 |
| Impact Modifier | See Table 1 | See Table 1 |

PARALOID K-175 is an acrylic polymer processing aids which is commercially available from The Dow Chemical Company (Midland, Mich., USA). PARALOID K-400 is an acrylic copolymer processing aids which is commercially available from The Dow Chemical Company. ADVASTAB TM-181FS is a methyl-tin based heat stabilizer which is commercially available from PMC Group (Mount Laurel, N.J., USA). ADVALUBE B-3314 is an ester based lubricant which is commercially available from PMC Group. FORMOLON 622S is a polyvinylchloride resin which is commercially available from Formosa Plastics Corporation, U.S.A. (Livingston, N.J. USA). UFT (CaCO$_3$) is commercially available from Omya, Inc. (Cincinnati Ohio, USA).

Components were added using the standard protocol for PVC powder blending in a Henschel-type blender. The resulting powder blends were allowed to stand for at least 24 hours at room temperature. A portion of the powder (usually about 220 grams) was then melt processed in an electric two-roll mill (Collin Mill Type # WW 150 p). The mill temperature was set at 190° C. with the front roll mill speed at 26 RPM and the back at 21 RPM. The polymer blend was melt processed for a total time of 5 minutes after fusion occurred. The sample was then placed in a 0.125 inch×8.5 inch×10 inch mold, by suitably folding the mass, and pressed in a Reliable press at 190° C. for 3 minutes at 15 tons and then 2 minutes at 45 tons. Cooling was accomplished under 45 tons for an additional 3-4 minutes. Samples were cut into test strips with dimensions according to the ASTM D-256 standard, notched with a mechanical notching tool and allowed to equilibrate at room temperature for 24 hours Testing was carried out with a 50-lb hammer in an Izod pendulum tester. Twenty specimens per sample were tested. The results were divided into brittle breaks and ductile (hinged) breaks, depending on whether, respectively, the sample hit by the hammer was cleanly broken into two portions as the crack traveled through the notch or if the sample remained as a single entity, where the two portions divided by the crack remained connected by a "hinge" of the plastic material. The percentage of ductile-type breaks for each set of specimens was recorded. If any anomalies, such as an observable delamination, were detected after the specimen was broken, that particular specimen was disregarded from the final calculations and the percentage of ductile breaks corrected accordingly.

The present invention may be embodied in other forms without departing from the spirit and the essential attributes thereof, and, accordingly, reference should be made to the appended claims, rather than to the foregoing specification, as indicating the scope of the invention.

We claim:

1. An emulsion polymerization process comprising (a) adding a reactive mixture to a reaction vessel, said reactive mixture comprising water, one or more emulsifiers, butyl acrylate, and an allyl methacrylate crosslinker having a free radical reactivity ratio of less than 1, (b) providing conditions in which said reactive mixture undergoes emulsion polymerization to form a crosslinked core comprising from 98 to 99.9 wt % units derived from butyl acrylate and from 0.1 to 2 wt % units derived from allyl methacrylate crosslinker having a glass transition temperature, Tg, of less than or equal to 10° C. and wherein the allyl methacrylate crosslinker is in an amount sufficient such that the crosslinked core has a swell ratio between 8 and 15 in THF and forming a polymer having a single volume average particle size from 150 to 400 nm and an original ratio of units derived from the allyl methacrylate crosslinker to units derived from the butyl acrylate; and (c) feeding additional allyl methacrylate crosslinker during polymerization in an amount sufficient to maintain the original ratio of allyl methacrylate crosslinker to butyl acrylate.

2. The process according to claim 1, further comprising monitoring the polymerization.

3. An impact modifier composition obtained according to the emulsion polymerization process of claim 1 comprising one or more core/shell polymers which comprise:

a crosslinked core having a glass transition temperature, Tg, of less than or equal to 10° C. and comprising from 98 to 99.9 wt % units derived from butyl acrylate and from 0.1 to 2 wt % units derived from ally methacrylate crosslinker, having a free radical reactivity ratio of less than 1, wherein the crosslinked core has a swell ratio in THF between 8 and 15; and a shell having from 20 to 100 wt % units derived from one or more (meth)acrylate monomers and having a Tg of equal to or greater than 20° C.; and wherein the swell ratio in THF of the crosslinked core is greater than the swell ratio of a crosslinked core having an identical composition but prepared according to a conventional single or multi-shot emulsion polymerization process; and wherein the one or more core/shell polymers have a single average particle size from 150 to 400 nm.

4. The impact modifier composition according to claim 3, wherein the crosslinked core comprises from 99.2 to 99.6 wt % units derived from butyl acrylate and from 0.4 to 0.8 wt % units derived from allyl methacrylate.

5. A polymer composition comprising:

from 70 to 90 wt % of one or more impact modifier compositions according to claim 3; and from 70 to 90 wt % base polymers selected from the group consisting of polyesters, styrenic polymers, polymethacrylates, polyvinylchloride, polycarbonate, polyamides, copolymers and blends thereof and combinations thereof.

* * * * *

UNITED STATES PATENT AND TRADEMARK OFFICE
CERTIFICATE OF CORRECTION

PATENT NO. : 10,253,123 B2
APPLICATION NO. : 15/535055
DATED : April 9, 2019
INVENTOR(S) : Michael T. Petr et al.

Page 1 of 1

It is certified that error appears in the above-identified patent and that said Letters Patent is hereby corrected as shown below:

In the Claims

Column 8 under Claim 3, Line 66:
Please correct the spelling of "ally" to "allyl".

Signed and Sealed this
Seventeenth Day of September, 2019

Andrei Iancu
*Director of the United States Patent and Trademark Office*